(12) United States Patent
Nikolov

(10) Patent No.: US 12,472,992 B2
(45) Date of Patent: Nov. 18, 2025

(54) DRIVING ASSISTANCE SYSTEM FOR THE AUTOMATED DRIVING OF A VEHICLE

(71) Applicant: Bayerische Motoren Werke Aktiengesellschaft, Munich (DE)

(72) Inventor: Ivo Nikolov, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 148 days.

(21) Appl. No.: 18/287,665

(22) PCT Filed: Apr. 19, 2022

(86) PCT No.: PCT/EP2022/060250
§ 371 (c)(1),
(2) Date: Oct. 20, 2023

(87) PCT Pub. No.: WO2022/223521
PCT Pub. Date: Oct. 27, 2022

(65) Prior Publication Data
US 2024/0182084 A1    Jun. 6, 2024

(30) Foreign Application Priority Data
Apr. 21, 2021   (DE) .................... 10 2021 110 090.9

(51) Int. Cl.
*B60W 60/00*   (2020.01)
*B60W 50/14*   (2020.01)
*B60W 50/16*   (2020.01)

(52) U.S. Cl.
CPC ........ *B60W 60/0053* (2020.02); *B60W 50/16* (2013.01); *B60W 2050/143* (2013.01); *B60W 2050/146* (2013.01)

(58) Field of Classification Search
CPC ..... B60W 2050/143; B60W 2050/146; B60W 30/12; B60W 50/082; B60W 50/14; B60W 50/16; B60W 60/0051; B60W 60/0053
See application file for complete search history.

(56) References Cited

U.S. PATENT DOCUMENTS

2020/0062278 A1   2/2020   Kuenzner
2021/0053590 A1   2/2021   Namba
(Continued)

FOREIGN PATENT DOCUMENTS

DE   10 2010 009 133 A1   8/2011
DE   10 2011 055 495 A1   5/2013
(Continued)

OTHER PUBLICATIONS

International Search Report (PCT/ISA/210) issued in PCT Application No. PCT/EP2022/060250 dated Aug. 25, 2022 with English translation (5 pages).
(Continued)

*Primary Examiner* — Wade Miles
*Assistant Examiner* — Zachary Joseph Wallace
(74) *Attorney, Agent, or Firm* — Crowell & Moring LLP

(57) ABSTRACT

A driving assistance system for the automated driving of a vehicle includes: a driving assistance module is configured to automate driving with a first degree of automation and a second higher degree of automation; an output module configured to output a driver instruction when a specified driver action is absent for a first period of time during
(Continued)

automated driving with the first degree; and a user input module configured to receive a user input for switching from the first degree to the second degree. The output module is further configured to output the driver instruction when: the system determines that the specified driver action is absent for a second period of time which is shorter than the first period of time, the user input for switching from the first degree to the second degree is received, and switching from the first degree the second degree of automation is unsuccessful.

11 Claims, 2 Drawing Sheets

(56) References Cited

U.S. PATENT DOCUMENTS

| | | | | |
|---|---|---|---|---|
| 2021/0370985 | A1* | 12/2021 | Lee | B60W 60/0061 |
| 2022/0032959 | A1* | 2/2022 | Homma | B60W 60/0018 |

FOREIGN PATENT DOCUMENTS

| | | |
|---|---|---|
| DE | 10 2017 208 504 A1 | 11/2018 |
| DE | 10 2017 208 506 A1 | 11/2018 |
| EP | 3 115 273 A1 | 1/2017 |

OTHER PUBLICATIONS

German-language Written Opinion (PCT/ISA/237) issued in PCT Application No. PCT/EP2022/060250 dated Aug. 25, 2022 with English translation (8 pages).

German Search Report issued in German Application No. 10 2021 110 090.9 dated Dec. 23, 2021 with partial English translation (10 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

* cited by examiner

DRIVING ASSISTANCE SYSTEM FOR THE AUTOMATED DRIVING OF A VEHICLE

BACKGROUND AND SUMMARY

The present disclosure relates to a driving assistance system for the automated driving of a vehicle, a vehicle having such a driving assistance system, a driving assistance method for the automated driving of a vehicle, and a storage medium for executing the driving assistance method. In particular, the present disclosure relates to a switchover of a lane departure warning system from a lower degree of automation to a higher degree of automation.

The development of driving assistance systems, for example for automated driving, is assuming increasing significance. One exemplary driving assistance system is a lane departure warning system. Using a camera, the lane departure warning system checks lane markings, and compares these with the position of the vehicle in the lane. In the event of an impending and unintentional departure of the vehicle from a lane, the lane departure warning system alerts the driver by means of an optical, acoustic and/or haptic signal. However, if the driver activates their indicators for a change of lane or turn-off from a lane, the lane departure warning system does not intervene in steering.

In addition to warning systems of this type, active lane departure warning systems also exist. An active lane departure warning system also employs a camera image, and compares the latter with the position of the actual vehicle. If the vehicle moves below a minimum distance from the lane boundary, the lane departure warning system steers the vehicle back into the center of the lane. As the driver is still responsible, even in the presence of an active lane departure warning system, the lane departure warning system continuously measures the manual torque which is applied by the driver to the steering wheel, and confirms whether the hands of the driver are still present on the steering wheel. If this is not the case, the driver is alerted to this effect, and the lane departure warning system is deactivated.

If the driver wishes to activate the lane departure warning system, it can occur that this activation is unsuccessful, for example on the grounds of unreliable sensor data. In such situations, it can occur that the driver is unaware of this unsuccessful activation, and assumes that the lane departure warning system is active. This can result in hazardous situations, for example if the driver removes their hands from the steering wheel, on the assumption that a lane departure warning system is activated.

The object of the present disclosure is the presentation of a driving assistance system for the automated driving of a vehicle, a vehicle having such a driving assistance system, a driving assistance method for the automated driving of a vehicle, and a storage medium for executing the driving assistance method, which can improve the safety of automated driving. In particular, the object of the present disclosure is to ensure the attention of a driver to the status of automated driving.

This object is fulfilled by the subject matter of the independent claims. Advantageous configurations are disclosed in the sub-claims.

According to one independent aspect of the present disclosure, a driving assistance system for the automated driving of a vehicle, in particular of a motor vehicle, is disclosed. The driving assistance system comprises a driving assistance module, which is configured for automated driving with a first degree of automation and for automated driving with a second degree of automation, wherein the second degree of automation is higher than the first degree of automation; an output module, which is configured to output a driver instruction when a specified driver action is absent for a first period of time during automated driving with the first degree of automation; and a user input module, which is configured to receive a user input for a switchover from the first degree of automation to the second degree of automation. The output module is further configured to output the driver instruction, if the following conditions are in force:
- the driving assistance system determines that the specified driver action is absent for a second period of time which is shorter than the first period of time;
- the user input for a switchover from the first degree of automation to the second degree of automation is received; and
- a switchover from the first degree of automation to the second degree of automation is unsuccessful.

According to the invention, in the event of a switchover from a lower degree of automation to a higher degree of automation, the time period pending the output of a driver instruction such as, for example, a hands-on request, is shortened. If the driver, in the event of an unsuccessful attempt to activate the higher degree of automation, removes their hands from the steering wheel, the corresponding driver instruction is thus issued more rapidly than normal. It can thus be ensured that the driver is rapidly made aware of the unsuccessful activation of the higher degree of automation, and acts accordingly. Hazardous situations associated with a defective perception of an activated driving assistance system can be prevented as a result.

The driving assistance module and/or the output module and/or the user input module can be embodied in a common software and/or hardware module. Alternatively, the driving assistance module and/or the output module and/or the user input module can respectively be embodied in separate software and/or hardware modules.

The driving assistance system is designed for automated driving. In the context of the present document, the term "automated driving" can be understood as driving with automated longitudinal or lateral guidance, or as autonomous driving with automated longitudinal and lateral guidance. Automated driving can be, for example, prolonged driving on a motorway, or short-term driving in the context of parking or maneuvering. The term "automated driving" encompasses automated driving with an arbitrary degree of automation. Exemplary degrees of automation are assisted driving, partially automated, highly automated or fully automated driving. These degrees of automation have been defined by the German Federal Highways Agency ("Bundesanstalt für Straßenwesen" or "BASt") (see BASt publication "Research Abstracts", November 2012 edition).

In assisted driving, the driver continuously executes longitudinal or lateral guidance, whereas the system assumes other respective functions, within specific limits. In partially automated driving (PAD), the system assumes longitudinal and lateral guidance for a specific time period and/or in specific situations, wherein the driver, as per assisted driving, is required to continuously monitor the system. In highly-automated driving (HAD), the system assumes longitudinal and lateral guidance for a specific time period, without the necessity for the continuous monitoring of the system by the driver; however, the driver must be capable of resuming control of the vehicle within a certain time. In fully automated driving (FAD), the system, in a particular application, can assume the automatic management of driving in all situations; in this application, a driver is no longer required.

The four above-mentioned degrees of automation correspond to SAE Levels 1 to 4, as per SAE Standard J3016 (SAE International—formerly the Society of Automotive Engineering). For example, highly automated driving (HAF) corresponds to Level 3 under SAE Standard J3016.

SAE J3016 further provides for SAE Level 5 as the highest degree of automation, which is not included in the definition applied by the BASt. SAE Level 5 corresponds to driverless driving, wherein the system is capable of the automatic management of all situations throughout the entire journey, in the same way as a human driver; in general, a driver is no longer required.

The first degree of automation preferably corresponds to SAE Level 2.

SAE Level 2 corresponds to a partial automation of vehicle control. In partially automated driving of this type, functions such as automatic parking, lane-keeping, general longitudinal guidance, acceleration and/or braking are assumed by the driving assistance system.

The second degree of automation preferably corresponds to SAE Level 3.

SAE Level 3 corresponds to a conditional automation of vehicle control. In a conditional automation of vehicle control of this type, the driver is not required to monitor the driving assistance system in an uninterrupted manner. The driving assistance system independently executes functions such as the actuation of indicators, lane changing and lane-keeping. However, it must be ensured that, if required, and at the request of the driving assistance system, the driver is capable of resuming control of the vehicle within a specific time.

The driving assistance system is preferably a lane departure warning system, in particular an active lane departure warning system with assisted steering. The active lane departure warning system assists the driver in the lateral guidance of the vehicle, e.g. with respect to a lane, wherein a steering torque is determined and delivered as an output to a driving system of the vehicle. The steering torque is a "restoring torque", which is introduced into the driving system of the vehicle, or the corresponding actuator, such that the vehicle is restored to its lane. The at least one actuator can moreover be designed to deliver a supporting torque, which supports the driver during the application of a desired (manual) steering torque.

Setting of the steering torque is executed, for example, such that a strength of the steering torque is determined and is delivered as an output of a command or instruction to the steering system of the vehicle. The term "strength of steering torque" refers to a variable (e.g. a magnitude or intensity) of the force which corresponds to the steering torque, which is delivered, for example, by the at least one actuator of the steering system. In particular, the strength of the steering torque or the restoring torque indicates the extent to which the steering action is influenced by the driving assistance system. In particular, the strength of the steering torque or of the restoring torque indicates an intensity of the intervention of the driving assistance system with respect to the driving system or the steering wheel.

The restoring torque can be quantitatively rated such that the vehicle is not maintained in its lane against the will of the driver, and it is possible for the driver to override the driving assistance system. To this end, the driver applies a correspondingly high manual steering torque to the steering wheel, such that a limiting value is exceeded, thereby resulting in a deactivation of the driving assistance system.

The driving assistance system preferably comprises at least one detection unit, which is designed to detect at least one lane. On the basis of detection data from the at least one detection unit, the driving assistance system supports the driver in the lateral guidance of the vehicle vis-à-vis the lane.

The at least one detection unit preferably comprises (or is) a camera, which is designed to capture at least one lane. The at least one camera can be, for example, a CMOS camera which is installed behind a windshield. From the images captured, the driving assistance system identifies lane markings and determines an optimum steering angle which is required to maintain the vehicle in the center of the lane. In the event of an impending departure of the vehicle from the center of a lane thus identified, the restoring torque is applied to the steering wheel.

The specified driver action is preferably the holding of the steering wheel by the driver. For example, in the case of a lane departure warning system according to SAE Level 2, the driver is required to keep their hands on the steering wheel such that, at any time, the driver is capable of resuming control, in the event that the lane departure warning system is switched off.

The driving assistance system is preferably designed to detect a manual torque which is applied to the steering wheel by the driver. On the basis of the manual driver torque thus detected, it can be determined whether the specified driver action is in force, in particular whether the driver (presumably) does not have their hands on the steering which, and the specified driver action is thus absent. It particular, it can be determined that the driver (presumably) does not have their hands on the steering wheel, if the manual torque detected is lower than (or equal to) a threshold value. In a similar manner, it can be determined that the driver has their hands on the steering wheel, if the manual torque detected is greater than (or equal to) a threshold value.

The driver instruction is preferably a hands-on request (HOR) or a take-over request (TOR).

The hands-on request is a request for the driver to apply their hands to the steering wheel, or to grip the steering wheel with their hands. In this case, the lane departure warning system can be active, and can be executing control of the vehicle. If the driving assistance system detects that the driver does not have their hands on the steering wheel, the output of a hands-on request can be delivered without the immediate deactivation of the lane departure warning system.

The take-over request is a request for the driver to assume control of the vehicle. In this case, the lane departure warning system can be deactivated, and control of the vehicle transferred to the driver. If, for example, an uncertainty in lane detection is too great, the output of a take-over request can be generated and the lane departure warning system deactivated.

The output module is preferably designed for outputting an optical and/or acoustic and/or haptic driver instruction.

In some embodiments, the output module can comprise at least one display apparatus, which is designed for the optical output or indication of the driver instruction. The display apparatus can be provided, for example, in or on the dashboard of the vehicle. The display apparatus can be, for example, a head unit. In some embodiments, the display apparatus comprises a LCD display, a plasma display or an OLED display.

Additionally or alternatively, the output module can comprise at least one loudspeaker, which is designed for the acoustic output of the driver instruction.

Additionally or alternatively, the output module can be designed for the haptic output of the driver instruction, for example by means of a vibration of the steering wheel.

Preferably, the first time period is 5 seconds or more, or 10 seconds or more. For example, the first time period can lie within a range of 5 to 15 seconds.

Additionally or alternatively, the second time period can be 4 seconds or fewer. For example, the second time period can be 1 second.

The first time period and the second time period can be defined with effect from a time point at which the driving assistance system establishes that the driver (presumably) no longer has their hands on the steering wheel. In particular, this time point can be a time point at which the driving assistance system establishes that the manual torque detected is equal to, or lower than the threshold value.

The driving assistance module comprises the user input module, which is designed for the reception of the user input for a switchover from the first degree of automation to the second degree of automation. The user input module can be provided, for example, in or on the dashboard of the vehicle. The user input module can be, for example, a head unit. In some embodiments, the user input module comprises at least one display apparatus such as, for example, a touchscreen, and/or at least one tactile control element, such as a switch, a key and/or a rotary switch.

According to a further aspect of the present disclosure, a vehicle, in particular a motor vehicle, is disclosed. The vehicle comprises the driving assistance system for automated driving, according to the embodiments of the present disclosure.

The term "vehicle" includes private cars, HGVs, buses, camper vans, motorcycles, etc., which are employed for the conveyance of goods, persons, etc. In particular, this term includes motor vehicles for the conveyance of persons.

According to a further independent aspect of the present disclosure, a driving assistance method for the automated driving of a vehicle, in particular of a motor vehicle. The driving assistance method comprises an output of a driver instruction in the event that, during automated driving with a first level of automation a specified driver action is absent for a first time period; reception of a user input for a switchover from the first degree of automation to a second degree of automation, wherein the second degree of automation is higher than the first degree of automation; and outputting of the driver instruction, in the event that:
 the specified driver action is absent for a second time period, which is shorter than the first time period; and
 a switchover from the first degree of automation to the second degree of automation is unsuccessful.

The driving assistance method for the automated driving of a vehicle can implement the aspects of the driving assistance system described in the present document for the automated driving of a vehicle.

According to a further independent aspect of the present disclosure, a software (SW) program is disclosed. The SW program can be designed to be run on one or more processors, in order to execute the driving assistance method described in the present document for the automated driving of a vehicle, in particular a motor vehicle.

According to a further independent aspect of the present disclosure, a storage medium is disclosed. The storage medium can comprise a SW program, which is designed to be run on one or more processors, in order to execute the driving assistance method described in the present document for the automated driving of a vehicle, in particular a motor vehicle.

According to a further independent aspect of the present disclosure, a software is disclosed having program code for the execution of the driving assistance method for the automated driving of a vehicle, in particular a motor vehicle, where the software is run on one or more software-controlled devices.

Exemplary embodiments of the disclosure are represented in the figures, and are described in greater detail hereinafter.

BRIEF DESCRIPTION OF THE DRAWINGS

Hereinafter, unless indicated otherwise, the same reference numbers are employed for identical and identically functioning elements.

DETAILED DESCRIPTION OF THE DRAWINGS

Figure 1:
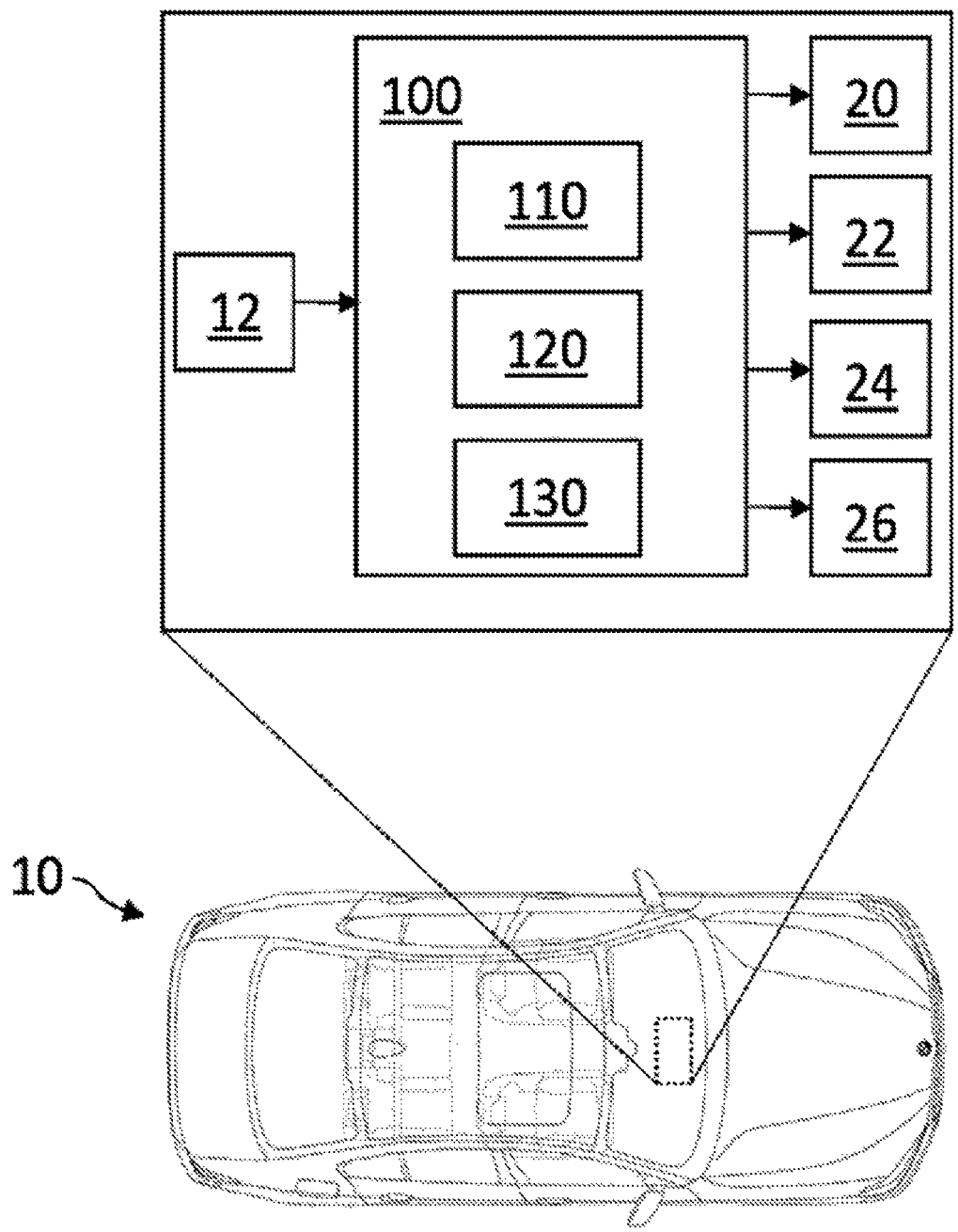
FIG. 1 is a schematic representation of a vehicle having a driving assistance system for automated driving, according to embodiments of the present disclosure.

FIG. 1 shows a schematic representation of a vehicle 10 having a driving assistance system 100 for automated driving, according to embodiments of the present disclosure.

The vehicle 10 comprises the driving assistance system 100 for automated driving. In automated driving, longitudinal and/or lateral guidance of the vehicle 10 is executed automatically. The driving assistance system 100 thus assumes control of the vehicle. To this end, the driving assistance system 100 controls the drive unit 20, the transmission 22, the hydraulic service brakes 24 and the steering 26, via unrepresented intermediate units.

For the planning and execution of automated driving, environmental information is received by the driving assistance system 100 from an environment sensor system which observes the vehicle environment. In particular, the vehicle can comprise at least one environment sensor 12 which is designed to capture environmental data which describe the vehicle environment. The at least one environment sensor 12 can comprise, for example, one or more LiDAR systems, one or more radar systems, one or more cameras and/or one or more laser scanners.

The driving assistance system 100 comprises a driving assistance module 110, which is configured for automated driving with a first degree of automation and for automated driving with a second degree of automation, wherein the second degree of automation is higher than the first degree of automation; an output module 120 which is configured to output a driver instruction when a specified driver action is absent for a first period of time during automated driving with the first degree of automation; and a user input module 130, which is configured to receive a user input for a switchover from the first degree of automation to the second degree of automation. The output module 120 is further configured to output the driver instruction, if the following conditions are in force:
 (i) the driving assistance system determines that the specified driver action is absent for a second period of time which is shorter than the first period of time;
 (ii) the user input for a switchover from the first degree of automation to the second degree of automation is received; and
 (iii) a switchover from the first degree of automation to the second degree of automation is unsuccessful.

The driving assistance system 100 can be an active lane departure warning system, which supports the driver for the lateral guidance of the vehicle. However, the present disclosure is not limited thereto, and other driving assistance systems which can be switched over between at least two degrees of automation are conceivable.

If the driver wishes to execute a switchover from a lower degree of automation to a higher degree of automation, but the execution of this switchover is not possible, for example on the grounds that a reliability of sensor data for the detection of a lane is not sufficient, a driver instruction is issued more rapidly than is normally the case in the event of a low degree of automation. It can thus be ensured that the driver is rapidly made aware of an unsuccessful activation of the higher degree of automation, and acts accordingly.

The driver instruction can be, for example, a hands-on request or a take-over request, the output of which to the driver is delivered optically and/or acoustically and/or haptically.

In some embodiments, the output module 120 can comprise at least one display apparatus, which is designed for the optical output or indication of the driver instruction. The display apparatus can be provided, for example, in or on the dashboard of the vehicle. The display apparatus can be, for example, a head unit. In some embodiments, the display apparatus comprises a LCD display, a plasma display or an OLED display. Additionally or alternatively, the output module 120 can comprise at least one loudspeaker, which is designed for the acoustic output of the driver instruction. Additionally or alternatively, the output module 120 can be designed for the haptic output or indication of the driver instruction, for example by means of a vibration of the steering wheel.

Figure 2:
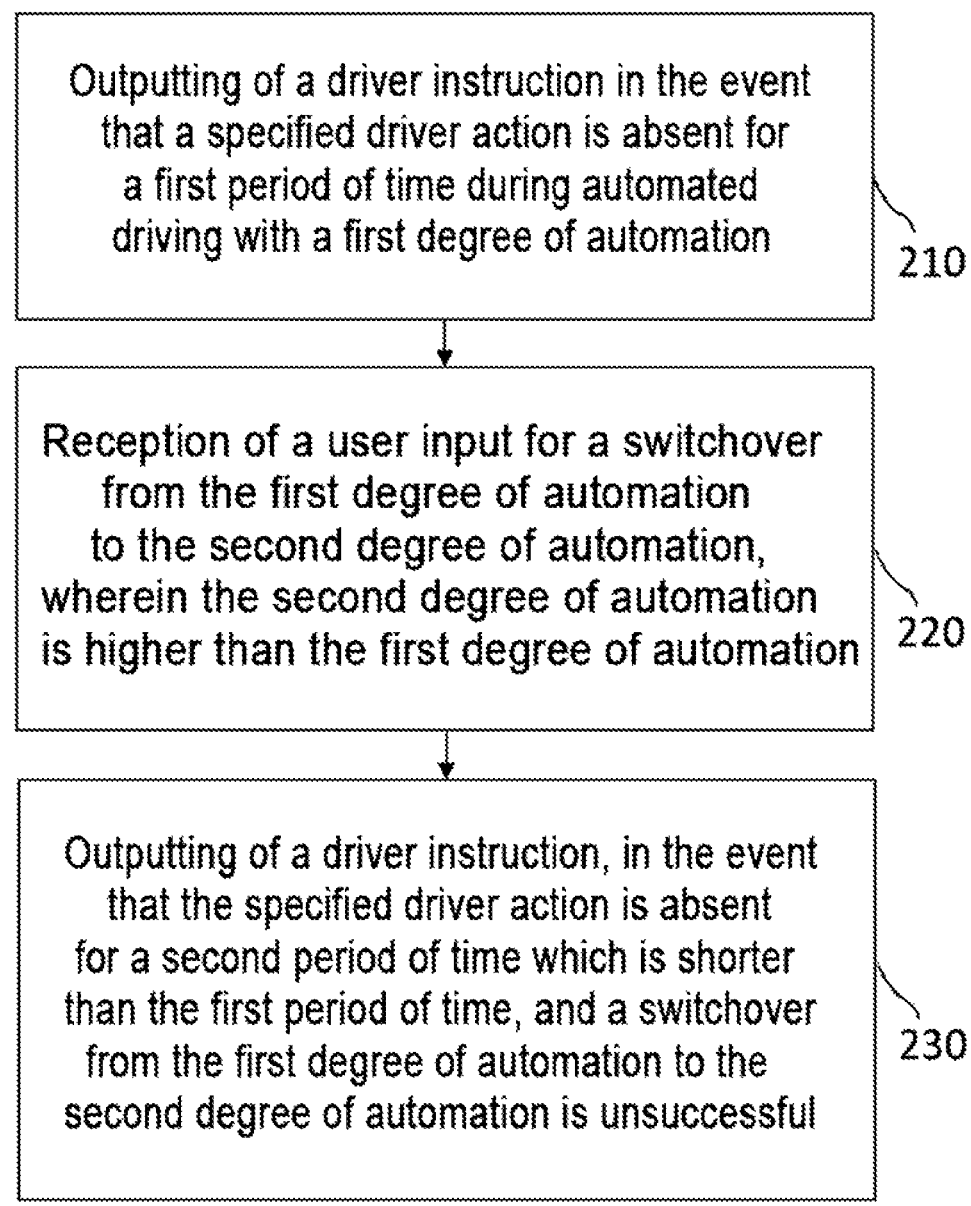
FIG. 2 is a flow diagram of a driving assistance method for the automated driving of a vehicle, according to embodiments of the present disclosure.

FIG. 2 shows a schematic representation of a flow diagram of a driving assistance method 200 for the automated driving of a vehicle, according to embodiments of the present disclosure. The driving assistance method 200 can be implemented by a corresponding software, which is executable on one or more processors (e.g. a CPU).

The driving assistance method 200 comprises, in block 210, an outputting of a driver instruction in the event that, during automated driving with a first degree of automation, a specified driver action is absent for a first period of time; in block 220, a user input is received for a switchover from the first degree of automation to the second degree of automation, wherein the second degree of automation is higher than the first degree of automation; and, in block 230, outputting of the driver instruction is executed in the event that:
  the specified driver action is absent for a second time period, which is shorter than the first time period; and
  a switchover from the first degree of automation to the second degree of automation is unsuccessful.

According to the invention, in the event of a switchover from a lower degree of automation to a higher degree of automation, the time period pending the output of a driver instruction such as, for example, a hands-on request, is shortened. If the driver, in the event of an unsuccessful attempt to activate the higher degree of automation, removes their hands from the steering wheel, the corresponding driver instruction is thus issued more rapidly than normal. It can thus be ensured that the driver is rapidly made aware of the unsuccessful activation of the higher degree of automation, and acts accordingly. Hazardous situations associated with a defective perception of an activated driving assistance function can be prevented as a result.

Although the invention has been described and illustrated in greater detail with reference to preferred exemplary embodiments, the invention is not limited by the examples disclosed, and further variations can be inferred herefrom by a person skilled in the art without departing from the protective scope of the invention. It is therefore evident that a multiplicity of potential variations exist. It is likewise clear that, in practice, the exemplary embodiments indicated represent examples only, and are not, under any circumstances, to be interpreted by way of a limitation, for example of the protective scope, potential applications or the configuration of the invention. The preceding description and the description of the figures will instead permit a person skilled in the art to undertake the practical implementation of exemplary embodiments, wherein the person skilled in the art, in the knowledge of the concept of the invention disclosed, will be able to implement numerous variations, for example with respect to the function or the arrangement of individual elements specified in an exemplary embodiment, without departing from the protective scope which is defined by the claims or by any legal equivalents thereof, for example by further explanations which are included in the description.

The invention claimed is:

1. A driving assistance system for automated driving of a vehicle, comprising:
  a driving assistance module, which is configured for automated driving with a first degree of automation that comprises at least partial automation of driving of the vehicle and for automated driving with a second degree of automation, wherein the second degree of automation is higher than the first degree of automation;
  an output module, which is configured to output a driver instruction when a specified driver action is absent for a first period of time during automated driving with the first degree of automation; and
  a user input module, which is configured to receive a user input for a switchover from the first degree of automation to the second degree of automation,
  wherein the output module is further configured to output the driver instruction when:
  (i) the user input for a switchover from the first degree of automation to the second degree of automation is received;
  (ii) the switchover from the first degree of automation to the second degree of automation is unsuccessful; and
  (iii) the driving assistance system determines that the specified driver action is absent for a second period of time which is shorter than the first period of time.

2. The driving assistance system according to claim 1, wherein the driving assistance system is a lane departure warning system.

3. The driving assistance system according to claim 1, wherein the specified driver action is a holding of a steering wheel by the driver.

4. The driving assistance system according to claim 1, wherein the driver instruction is a hands-on request or a take-over request.

5. The driving assistance system according to claim 1, wherein the output module is configured for outputting an optical, acoustic, and/or haptic driver instruction.

6. The driving assistance system according to claim 1, wherein
  the first time period is 5 seconds or more, and/or
  the second time period is 4 seconds or fewer.

7. The driving assistance system according to claim 6, wherein
the first time period lies within a range of 5 to 15 seconds, and/or
the second time period is 1 second.

8. The driving assistance system according to claim 1, wherein
the first degree of automation corresponds to SAE Level 2, and
the second degree of automation corresponds to SAE Level 3.

9. A vehicle comprising the driving assistance system according to claim 1.

10. A driving assistance method for automated driving of a vehicle, comprising:
outputting a driver instruction in an event that, during automated driving with a first level of automation that comprises at least partial automation of driving of the vehicle, a specified driver action is absent for a first time period;
receiving a user input for a switchover from the first degree of automation to a second degree of automation, wherein the second degree of automation is higher than the first degree of automation; and
outputting the driver instruction when:
(i) the switchover from the first degree of automation to the second degree of automation is unsuccessful; and
(ii) the specified driver action is absent for a second time period, which is shorter than the first time period.

11. A computer product comprising a non-transitory computer readable medium having stored thereon program code which, when executed on one or more processors, carries out the acts of:
outputting a driver instruction in an event that, during automated driving with a first level of automation, a specified driver action is absent for a first time period;
receiving a user input for a switchover from the first degree of automation, that comprises at least partial automation of driving of the vehicle, to a second degree of automation, wherein the second degree of automation is higher than the first degree of automation; and
outputting the driver instruction when:
(i) the switchover from the first degree of automation to the second degree of automation is unsuccessful; and
(ii) the specified driver action is absent for a second time period, which is shorter than the first time period.

* * * * *